US012411233B2

(12) United States Patent
Cass et al.

(10) Patent No.: US 12,411,233 B2
(45) Date of Patent: *Sep. 9, 2025

(54) RADAR SYSTEM FOR GENERATING AN ON-DEMAND DISTRIBUTED APERTURE BY MECHANICAL ARTICULATION

(71) Applicant: GM Cruise Holdings LLC, San Francisco, CA (US)

(72) Inventors: Devin Cass, San Francisco, CA (US); Jack Stepanian, San Francisco, CA (US); Daniel Flores Tapia, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 325 days.

This patent is subject to a terminal disclaimer.

(21) Appl. No.: 18/112,607

(22) Filed: Feb. 22, 2023

(65) Prior Publication Data

US 2023/0204764 A1    Jun. 29, 2023

Related U.S. Application Data

(63) Continuation of application No. 17/220,397, filed on Apr. 1, 2021, now Pat. No. 11,614,537.

(51) Int. Cl.
*G01S 13/931* (2020.01)
*G01S 7/42* (2006.01)

(52) U.S. Cl.
CPC ............. *G01S 13/931* (2013.01); *G01S 7/42* (2013.01); *G01S 2013/932* (2020.01); *G01S 2013/93271* (2020.01); *G01S 2013/93274* (2020.01)

(58) Field of Classification Search
CPC ...... G01S 13/42; G01S 13/865; G01S 13/867; G01S 13/87; G01S 13/878; G01S 13/931; G01S 2013/9318; G01S 2013/93185; G01S 2013/9319; G01S 2013/932; G01S 2013/93271; G01S 2013/93274; G01S 7/42

See application file for complete search history.

(56) References Cited

U.S. PATENT DOCUMENTS

| | | | |
|---|---|---|---|
| 11,614,537 B2 * | 3/2023 | Cass | G01S 13/931 342/70 |
| 2021/0024144 A1 * | 1/2021 | Patnaik | G01S 13/867 |
| 2021/0055373 A1 * | 2/2021 | Smith | G01S 7/003 |

* cited by examiner

*Primary Examiner* — Timothy A Brainard
(74) *Attorney, Agent, or Firm* — CANTOR COLBURN LLP

(57) ABSTRACT

Methods and systems are provided for generating an on-demand distributed aperture by mechanical articulation. In some aspects, a process can include steps for determining a location of an autonomous vehicle, determining whether a maneuver requires long range detections or medium range detections based on the location of the autonomous vehicle, positioning at least two articulated radars based on the determining of whether the maneuver requires long range detections or medium range detections, and enabling a mode of resolution based on the positioning of the at least two articulated radars and by utilizing a static radar. Systems and machine-readable media are also provided.

20 Claims, 7 Drawing Sheets

RADAR SYSTEM FOR GENERATING AN ON-DEMAND DISTRIBUTED APERTURE BY MECHANICAL ARTICULATION

CROSS-REFERENCE TO RELATED APPLICATIONS

This application is a continuation of and claims the benefit of U.S. application Ser. No. 17/220,397, filed on Apr. 1, 2021, entitled RADAR SYSTEM FOR GENERATING AN ON-DEMAND DISTRIBUTED APERTURE BY MECHANICAL ARTICULATION, which is expressly incorporated by reference herein in its entirety.

BACKGROUND

1. Technical Field

The subject technology provides solutions for autonomous vehicles, and in particular, for radar system for generating an on-demand distributed aperture by mechanical articulation.

2. Introduction

Autonomous vehicles (AVs) are vehicles having computers and control systems that perform driving and navigation tasks that are conventionally performed by a human driver. As AV technologies continue to advance, ride-sharing services will increasingly utilize AVs to improve service efficiency and safety. However, AVs will be required to perform many of the functions that are conventionally performed by human drivers, such as avoiding dangerous or difficult routes, and performing other navigation and routing tasks necessary to provide a safe and efficient transportation. Such tasks may require the collection and processing of large quantities of data using various sensor types, including but not limited to cameras, radars, and/or Light Detection and Ranging (LiDAR) sensors disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
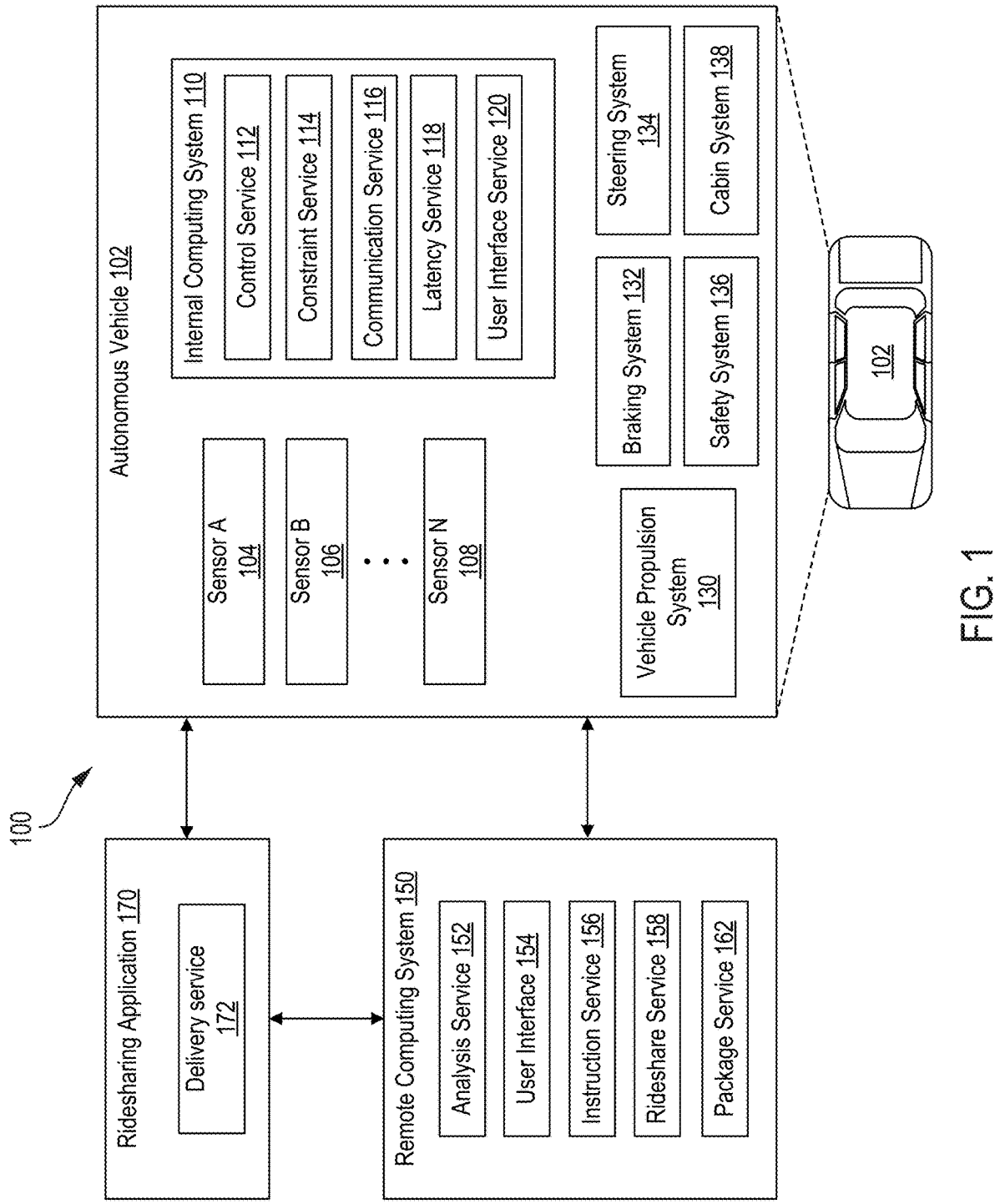
FIG. 1 illustrates an example system environment that can be used to facilitate autonomous vehicle navigation and routing operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is a radar system that is configured to generate an on-demand distributed aperture by mechanical articulation. The present disclosure contemplates that in some instances, the radar system provides a very high resolution field of vision generated by distributed aperture. The present disclosure also contemplates utilizing the radar system to provide a wide field of view that is generated by articulating the radars out to the side of an autonomous vehicle.

In autonomous vehicle (AV) deployments, there are two types of radar sensing for autonomous vehicles: 1) city driving, and 2) highway driving. City driving includes utilizing medium range sensing radar with wide azimuth field of view coverage (e.g., 360° around the autonomous vehicle). Highway driving includes utilizing long range sensing radar with high angular resolution coverage in a specific azimuth area (e.g., in front of the autonomous vehicle).

These requirements can both be achieved by placing several radars around the autonomous vehicle, thereby maximizing the range and angular resolution of each radar. However, doing so comes at a significant monetary cost as well as other costs associated with size, weight, and power consumption.

Techniques to increase the resolution and range of radar sensing include using several radars mounted in different positions, but pointed in the same direction. These radars are time synchronized and their signal processing implements specific algorithms leveraging the knowledge of their positioning and time synchronization. This is also known as "distributed aperture radar." However, this, in itself, does not solve the problem of having too many radars. In fact, using distributed aperture radar requires more radars that are pointed in the same direction, thereby requiring the use of even more radars.

Aspects of the disclosed technology address the foregoing limitations of conventional radar sensing by maximizes the use of available radar modes by adding the combination of mechanical articulation and static radar mounting to toggle between forward facing very high resolution distributed aperture mode for highway driving and standard high resolution wide field of view city mode at the lowest cost. In some aspects, the disclosed technology can also reduce the number of modules and overall part count in an autonomous vehicle. In other aspects, the disclosed technology also reduces the overall radar count and cost of total parts, while optimizing their use during highway and city driving situations.

As discussed in further detail below, the disclosed technology further contemplates a radar system workflow that can include: 1) a reduced number of modules and the overall part count in the autonomous vehicle; and 2) fully leverage data collected by radars of the autonomous vehicle for optimizing highway and city driving situations.

FIG. 1 illustrates an example system environment 100 that can be used to facilitate AV dispatch and operations, according to some aspects of the disclosed technology. Autonomous vehicle 102 can navigate about roadways without a human driver based upon sensor signals output by sensor systems 104-106 of autonomous vehicle 102. Autonomous vehicle 102 includes a plurality of sensor systems 104-106 (a first sensor system 104 through an Nth sensor system 106). Sensor systems 104-106 are of different types and are arranged about the autonomous vehicle 102. For example, first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it is understood that more or fewer sensors may be coupled to the autonomous vehicle 102.

Autonomous vehicle 102 further includes several mechanical systems that are used to effectuate appropriate motion of the autonomous vehicle 102. For instance, the mechanical systems can include but are not limited to, vehicle propulsion system 130, braking system 132, and steering system 134. Vehicle propulsion system 130 may include an electric motor, an internal combustion engine, or both. The braking system 132 can include an engine brake, brake pads, actuators, and/or any other suitable componentry that is configured to assist in decelerating autonomous vehicle 102. In some cases, braking system 132 may charge a battery of the vehicle through regenerative braking. Steering system 134 includes suitable componentry that is configured to control the direction of movement of the autonomous vehicle 102 during navigation. Autonomous vehicle 102 further includes a safety system 136 that can include various lights and signal indicators, parking brake, airbags, etc. Autonomous vehicle 102 further includes a cabin system 138 that can include cabin temperature control systems, in-cabin entertainment systems, etc.

Autonomous vehicle 102 additionally comprises an internal computing system 110 that is in communication with sensor systems 180 and systems 130, 132, 134, 136, and 138. Internal computing system 110 includes at least one processor and at least one memory having computer-executable instructions that are executed by the processor. The computer-executable instructions can make up one or more services responsible for controlling autonomous vehicle 102, communicating with remote computing system 150, receiving inputs from passengers or human co-pilots, logging metrics regarding data collected by sensor systems 180 and human co-pilots, etc.

Internal computing system 110 can include a control service 112 that is configured to control operation of vehicle propulsion system 130, braking system 132, steering system 134, safety system 136, and cabin system 138. Control service 112 receives sensor signals from sensor systems 180 as well communicates with other services of internal computing system 110 to effectuate operation of autonomous vehicle 102. In some embodiments, control service 112 may carry out operations in concert one or more other systems of autonomous vehicle 102. Internal computing system 110 can also include constraint service 114 to facilitate safe propulsion of autonomous vehicle 102. Constraint service 116 includes instructions for activating a constraint based on a rule-based restriction upon operation of autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of control service 112.

The internal computing system 110 can also include communication service 116. The communication service 116 can include both software and hardware elements for transmitting and receiving signals from/to the remote computing system 150. Communication service 116 is configured to transmit information wirelessly over a network, for example, through an antenna array that provides personal cellular (long-term evolution (LTE), 3G, 4G, 5G, etc.) communication.

Internal computing system 110 can also include latency service 118. Latency service 118 can utilize timestamps on communications to and from remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, latency service 118 can enable other systems of autonomous vehicle 102 or a passenger to make necessary decisions or to provide the needed feedback.

Internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

Remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102. Remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

Remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102. Remote computing system 150 can also include rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

Figure 2:
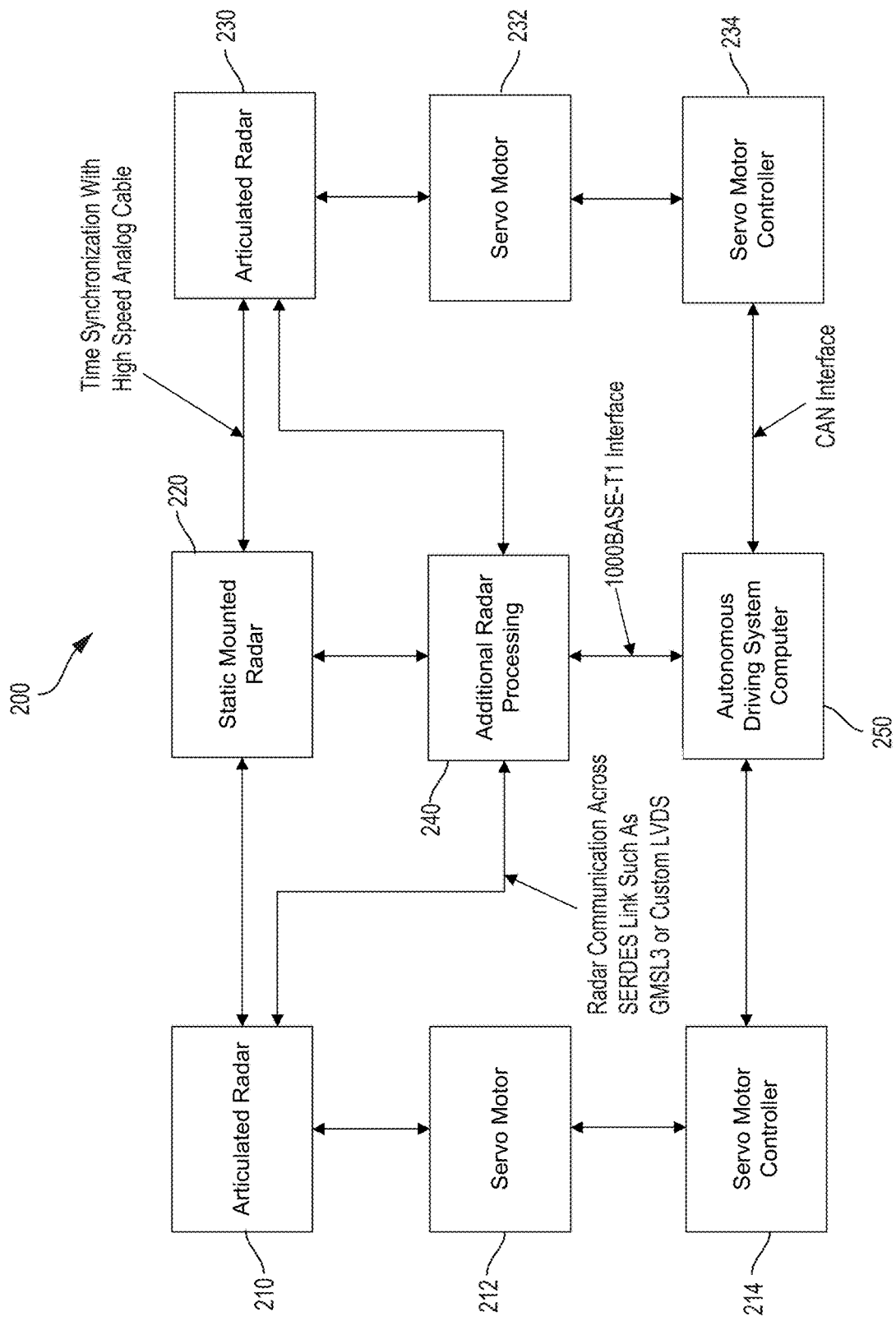
FIG. 2 illustrates an example system for generating an on-demand distributed aperture by mechanical articulation, according to some aspects of the disclosed technology.

FIG. 2 illustrates an example system 200 for generating an on-demand distributed aperture by mechanical articulation, according to some aspects of the disclosed technology. System 200 can include articulated radars 210, 230, a static mounted radar 220, additional radar processing 240, and an autonomous driving system computer 250. Articulated radar 210 can include a servo motor 212 and a servo motor controller 214. Similarly, articulated 230 can include a servo motor 232 and a servo motor controller 234. Communications and exchange of data between articulated radar 210, 230, servo motor 212, 232, servo motor controller 214, 234, static mounted radar 220, additional radar processing 240, and autonomous driving system computer 250 can be performed or facilitated with wired or wireless communications via wired and/or wireless transceivers.

In other implementations, system 200 (e.g., servo motor 212, servo motor controller 214, additional radar processing 240, and/or autonomous driving system computer 250) can also be integrated into individual, specialized computing modules that are physically located proximate to radars 210, 220, 230, which may be utilized due to cable length limitations of the high speed cables. Moreover, system 200 can be utilized alongside autonomous driving system computer 250 along with network switches and other sensors such as cameras and lidar. Mounting brackets can also be utilized by system 200 to mount radars 210, 220, 230 and servo motors 212, 232.

Figure 4:
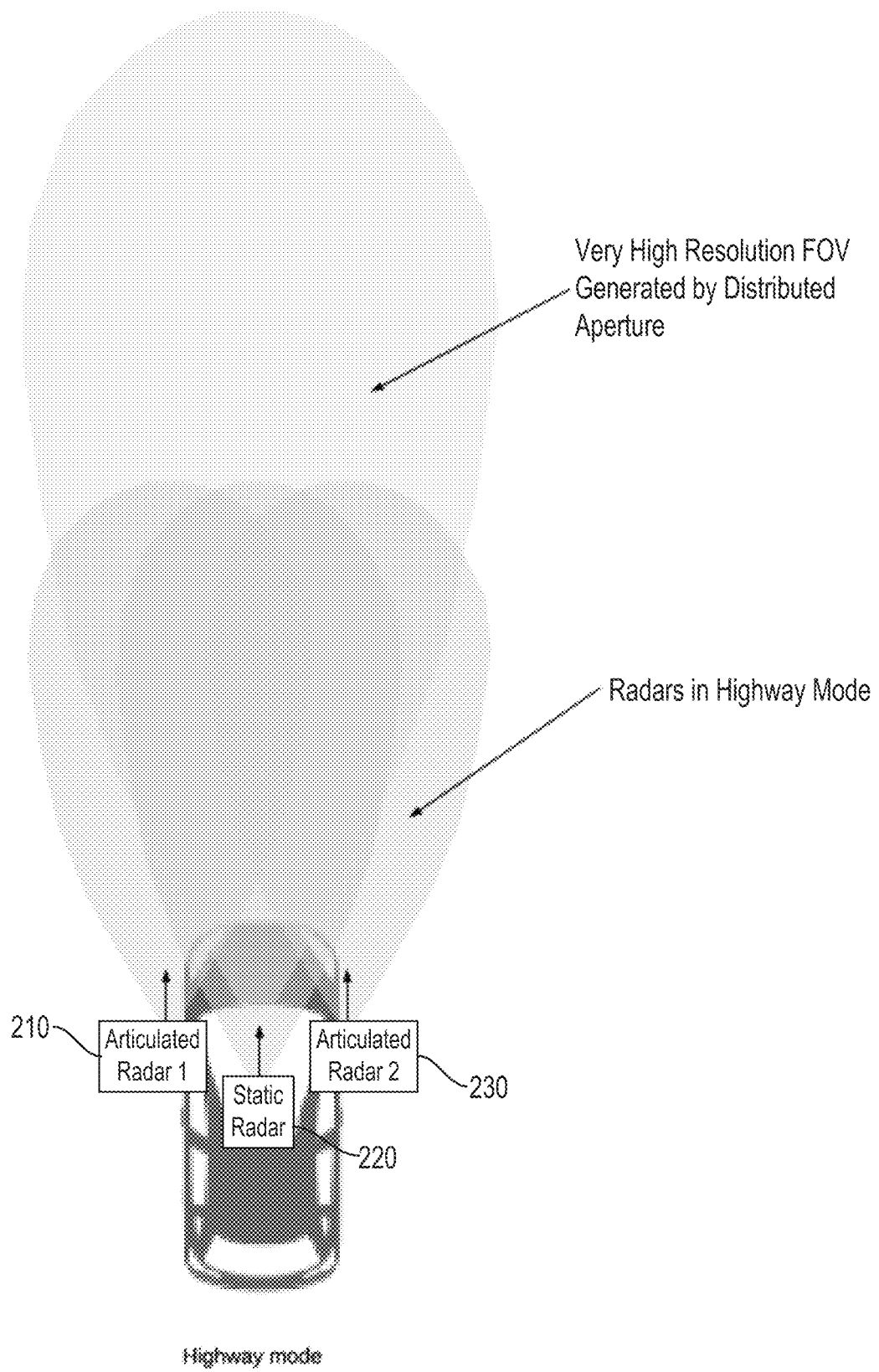
FIG. 4 illustrates an example top perspective view of Highway Mode, according to some aspects of the disclosed technology.
Figure 5:
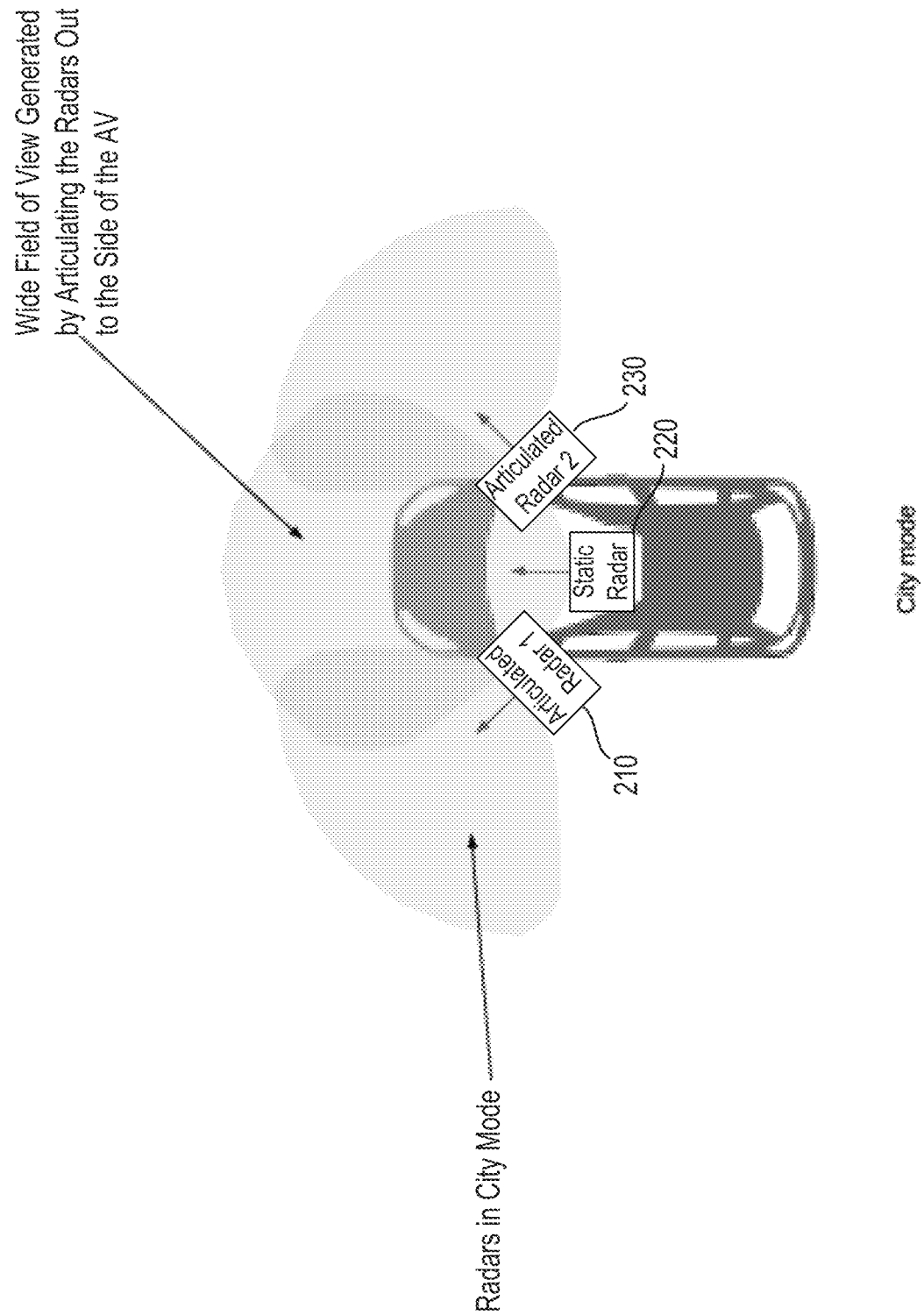
FIG. 5 illustrates an example top perspective view of City Mode, according to some aspects of the disclosed technology.

In some implementations, articulated radars 210, 230 can be pivotally positionable on an autonomous vehicle as shown in FIGS. 4 and 5. For example, articulated radars 210, 230 can be repositioned with servo motors 212, 232. Servo motors 212, 232 can include a rotary or linear actuator that can control angular, position, linear position, velocity, and acceleration. Servo motors 212, 232 can further include sensors that are configured to provide position feedback to servo motor controllers 214, 234 and autonomous driving system computer 250. Servo motors 212, 232 are controlled by corresponding servo motor controllers 214, 234. Servo motor controllers 214, 234 can also receive instructions on how to reposition servo motors 212, 232 from autonomous driving system computer 250. Furthermore, articulated radars 210, 230 are shown in FIGS. 4 and 5 as being positioned towards the front, sides of the autonomous vehicle. Articulated radars 210, 230 can also be positioned at the front of the autonomous vehicle (e.g., towards the bumper of the autonomous vehicle), top of the autonomous vehicle (e.g., towards the roof of the autonomous vehicle), or any region of the autonomous vehicle that is suitable for the intended purpose and understood by a person of ordinary skill in the art.

In other implementations, articulated radars 210, 230 can be positioned up high with respect to the autonomous vehicle so that articulated radars 210, 230 have a clear line of sight around the autonomous vehicle. By being positioned as such, articulated radars 210, 230 can avoid radar reflections due to being positioned proximate to the side of the autonomous vehicle. Moreover, radars 210, 220, 230 and servo motors 212, 232 are relatively heavy and subject to vibration, which can degrade the servo motors 212, 232 more quickly. As such, system 200 can further include mounting brackets or components that take into consideration such weight limitations and vibrational degradation. Articulated radars 210, 230 of system 200 can further be configured to provide fast radar articulation so that the autonomous vehicle can be prepared to return to a lower speed cruising mode (e.g., City Mode) after an unprotected left turn or after exiting a highway. The speed at which articulated radars 210, 230 pivotally change their position may correspond to the responsiveness of articulated radars 210, 230 and an average time for maneuvers, etc. Servo motors 212, 232 and servo motor controllers 214, 234 can also include a predetermined minimum servo performance.

With an initial axis being defined as pointing at 0° is the direction of travel for the autonomous vehicle, articulated radars 210, 230 can be positioned approximately at 0° when in Highway Mode and between 0° and +180°/−180° when in City Mode. Highway Mode can include instances where the autonomous vehicle enters a highway, travels at a relatively high speed, enters an intersection to perform an unprotected left turn, or any other circumstance that would benefit by having a very high resolution field of view that is generated by the distributed aperture of articulated radars 210, 230. City Mode can include instances where the autonomous vehicle travels at a relatively slow speed (e.g., when in a city), requires a wider field of view, or any other circumstance that would benefit by having a wide field of view that is generated by articulated radars 210, 230, which are positioned to the side of the autonomous vehicle.

In some implementations, articulated radars 210, 230 can be configured to cover 360° of the autonomous vehicle in City Mode, and less than 360° when system 200 of the autonomous vehicle is in the Highway Mode or when turning (e.g., performing an unprotected left turn). For example, in a configuration where system 200 includes four radars in a cardinal configuration (e.g., North, East, South, and West). Three out of the four radars can be pointed directly forward for Highway or Unprotected Turning Modes, while two out of the four radars can be pointed to the side (e.g., at 90°/−90°) during City Mode, thereby providing 360° cover. In this example implementation, the radar field of view are approximately ±60°.

When the autonomous vehicle triggers a Highway Mode event, autonomous driving system computer 250 can detect or determine such an event and instruct servo motor controller 214, 234 to utilize servo motor 212, 232 to reposition articulated radars 210, 230 accordingly (e.g., reposition articulated radars 210, 230 to 0°). Autonomous driving system computer 250 can receive corresponding data relating to determining when an event triggers Highway Mode and City Mode from various sensors distributed throughout the autonomous vehicle. When the autonomous vehicle triggers a City Mode event, autonomous driving system computer 250 can detect or determine such an event and instruct servo motor controller 214, 234 to utilize servo motor 212, 232 to reposition articulated radars 210, 230 accordingly (e.g., reposition articulated radars 210, 230 to the sides of the autonomous vehicle between 0° and +180°/−180°).

In some implementations, autonomous driving system computer 250 of system 200 can further include map data and localization information of the autonomous vehicle (e.g., geographical position of the autonomous vehicle). Autonomous driving system computer 250 can utilize the map data and the autonomous vehicle's localization on the map to determine whether the autonomous vehicle is at an intersection, which may indicate that the autonomous vehicle may turn into oncoming traffic. Examples of turns that can be performed by the autonomous vehicle include minor/major turns (e.g., turning left or right from a slower posted speed limit street onto a faster posted speed limit street), an unprotected left turn (e.g., across traffic, which may require scanning a longer distance with radars 210, 220, 230), an unprotected U-turn, or when overtaking another vehicle by moving into oncoming traffic. Autonomous driving system computer 250 of system 200 can be configured to detect these types of scenarios from its localization to the map or from real world data. For example, autonomous driving system computer 250 of system 200 can observe that there is a double parked vehicle, thereby performing actions as described herein to safely overtake the double parked vehicle into oncoming traffic. Autonomous driving system computer 250 of system 200 can quickly change the radar yaw angles (e.g., with servo motors 212, 232 and servo motor controllers 214, 234) to look into oncoming traffic, thereby temporarily enabling distributed aperture to obtain the extra range and resolution while reducing false positives and uncertainties, while making the maneuver, and thereafter, quickly return articulated radars 210, 230 back to 360° coverage of the autonomous vehicle.

In other implementations, additional radar processing 240 can provide further feedback and information between articulated radars 210, 230 and autonomous driving system computer 250. Some examples include radar communication across a serializer/deserializer ("SERDES") link such as a gigabit multimedia serial link (GMSL3) or a custom low-voltage differential signaling (LVDS). A 1000BASE-T1 interface can also be utilized to facilitate communications between additional radar processing 240 and autonomous driving system computer 250.

Additional radar processing 240 of system 200 can also include several signal processing techniques by which to implement the additional radar processing. For example, a processor as described herein can generate virtual channels by computing the convolution of transmit and receive channels and perform additional fast fourier transform (FFT) computations on the transmit and receive channels. In the instances where radars 210, 220, 230 are not capable of handling the above-mentioned computations, additional radar processing 240 of system 200 can be utilized to perform the computations as the channel count is effectively doubled. Additional radar processing 240 can further implement signal processing on any of the cross-coupled radars (e.g., radars 210, 220, 230). Each of radars 210, 220, 230 can receive a signal from its own transmission. However, each of radars 210, 220, 230 can also receive its neighbor's transmissions, which also have to be processed accordingly. For example, each of radars 210, 220, 230 can process signals from its own transmission, but interference transmissions can also be encountered from the other radars 210, 220, 230. In such an instance, additional radar processing/processors 250 can be utilized to assist in the processing of the received signals. For example, additional radar processing 250 can be utilized to compute loads that are too high for a single radar. Other dynamics can also be extracted when using signals from neighboring radars and processed by additional radar processing 250 of system 200.

In some implementations, static mounted radar 220 can be positioned towards the center region of the roof of the autonomous vehicle as shown in FIGS. 4 and 5. Static mounted radar 220 can be permanently positioned such that static mounted radar 220 is always directed at 0° of the autonomous vehicle. Though static mounted radar 220 is shown as being at the center of the roof of the autonomous vehicle, static mounted radar 220 may also be positioned slightly to one side of the roof of the autonomous vehicle. Furthermore, static mounted radar 220 may also be positioned towards the bumper of the autonomous vehicle. It is also contemplated that there may be more than one static mounted radars 220. For example, two static mounted radars 220 may be positioned on the bumper/roof of the autonomous vehicle. One static mounted radar 220 may be a redundant/back up static mounted radar 200 to the other static mounted radar 200, or one of the two static mounted radars 200 may be utilized at a given time by the autonomous vehicle. Static mounted radar 220 can also communicate with articulated radars 210, 230 via a high speed analog cable. Time synchronization data can be communicated between static mounted radar 220 and articulated radars 210, 230 so that static mounted radar 220 and articulated radars 210, 230 are synchronized with each other. Static mounted radar 220 can also be positioned low at the fascia of the autonomous vehicle in order to provide a large separation between articulated radars 210, 230 in elevation, thereby increasing the possible elevation resolution.

Autonomous driving system computer 250 may be a processor-based system as described herein. Autonomous driving system computer 250 may also communicate to servo motor controllers 214, 234 via a controller area network (CAN) interface. Other types of interfaces can also be utilized to facilitate communication between autonomous driving system computer 250 and servo motor controllers 214, 234 that is suitable for the intended purpose and understood by a person of ordinary skill in the art. Autonomous driving system computer 250 of system 200 can further include features such as complex safety strategies and several CPU and GPU components to process perception and path planning for system 200 to operate as described herein. Interfaces throughout the autonomous vehicle can also be controlled by autonomous driving system computer 250.

In some implementations, system 200 utilizes mechanical articulation of articulated radars 210, 230. For example, articulated radars 210, 230 can be pointed at an arbitrary angle to maximize field-of-view coverage when driving in the city (e.g., City Mode), at lower speeds, where objects are more difficult to predict such as pedestrians, cyclists, etc. System 200 includes one implementation of a forward facing radar 220 statically mounted in the center of the autonomous vehicle and two articulated radars 210, 230 that can be mounted on each corner of the autonomous vehicle. For example, articulated radars 210, 230 can point at 45° and −45°, while the center radar 220 points at 0°. If radars 210, 220, 230 have a large field of view, a wide field of view coverage can be provided where city objects are best tracked.

When static mounted radar 220 and articulated radars 210, 230 are all pointed at 0° (e.g., forward of the autonomous vehicle), system 200 can maximize resolution by also utilizing a distributed aperture technique. This technique may be utilized when the autonomous vehicle is in Highway Mode and the autonomous vehicle is traveling at a much higher speed. The area of interest for sensing is directly in front of the autonomous vehicle in the path of travel when in Highway Mode, and more specifically, in the lane of travel. Highway Mode sacrifices the width of the radar field of view coverage for the resolution of forward only coverage. In some instances, the radars (e.g., static radar 220 and articulated radars 210, 230) enable distributed aperture mode by summing the receive signals with a complex coefficient across all of the receive channels for both types of radars (e.g., static radar 220 and articulated radars 210, 230). The summation forms a larger sparse virtual array that can be achieved by system 200. The distributed aperture approach/technique, as described herein, can combine the responses from the different radar sensors 210, 220, 230 at a central compute element (e.g., autonomous deriving system computer 250 or additional radar processing 240). The responses from each sensor 210, 220, 230 can be calibrated to take into account the location and orientation of each respective sensor 210, 220, 230. After this step, the responses from the sensors 210, 220, 230 can be positioned in their appropriate locations/orientations, and spatial frequency space data can be utilized by system 200 to generate a point cloud image. This process, as described herein, can enable system 200 to emulate an adaptive sensor with a larger size (e.g., without actually having a larger sized adaptive sensor) with radar sensors 210, 220, 230, which yields a smaller resolution, a larger field of view, and longer range.

Highway Mode is immensely beneficial to the autonomous vehicle because it maximizes the use of the radar's modes by providing a distributed aperture very high resolution mode (e.g., generated by static radar 220 and articulated radar 210, 230), without having to add a significant amount of extra hardware to the autonomous vehicle itself.

In some implementations, articulated radars 210, 230 can include multiple electronically controlled modes in order to maximize resolution or field of view in the appropriate situations as described herein. For example, the City Mode of a high resolution radar (e.g., articulated radars 210, 230) increases the field of view at the expense of range. In Highway Mode, a high resolution radar (e.g., articulated radar 210, 230) increases its range, but decreases its field of view. This is an acceptable trade off because detection range is prioritized when traveling at higher speeds. Utilizing distributed aperture without mechanically articulated radars 210, 230 requires the addition of more radars that all have to point in the same direction. Also, by doing so, distributed aperture without mechanically articulated radars 210, 230 does not grant a large advantage for city driving, as it does not solve the problem of maximizing field of view at a minimum cost. However, when you can mechanically toggle between a forward facing distributed aperture radar (e.g., Highway Mode) and a wide field of view radar (e.g., City Mode), the autonomous vehicle can realize very advantageous modes at a lower cost.

Figure 3:
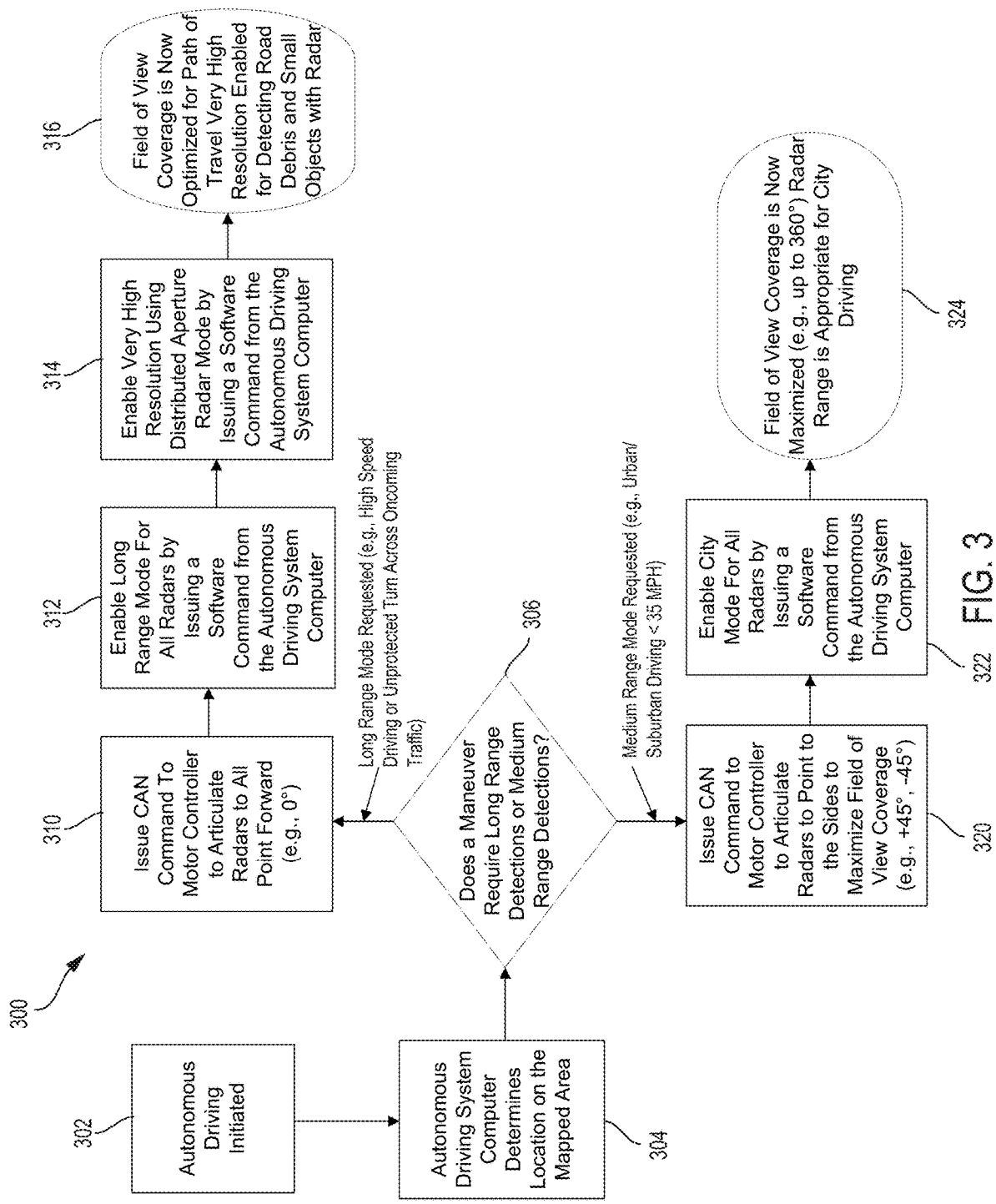
FIG. 3 illustrates an example process of utilizing mechanically articulated radars, according to some aspects of the disclosed technology.

FIG. 3 illustrates an example process 300 of utilizing mechanically articulated radars, according to some aspects of the disclosed technology. Process 300 begins with step 302, in which autonomous driving of an autonomous vehicle is initiated. Thereafter, process 300 may advance to step 304, in which an autonomous driving system computer of the autonomous vehicle determines a location of the autonomous vehicle on a mapped area. At step 306, process 300 can determine whether a maneuver requires long range detection (e.g., Highway Mode) or medium range detection (e.g., City Mode).

If the maneuver requires long range detections or long range mode is requested (e.g., high speed driving or unprotected turn across oncoming traffic), process 300 may advance to step 310 and issue a CAN command to servo motor controllers (e.g., servo motor controllers 214, 234) to articulate radars (e.g., articulated radars 210, 230) to point forward (e.g., 0°).

Process 300 may then advance to step 312, which includes enabling long range mode (e.g., Highway Mode) for the radars (e.g., articulated radars 210, 230) by issuing a software command from the autonomous driving system computer 250. This can include instructing the radars to prioritize range and resolution at the expense of range gate size and velocity gate size.

Process 300 may then advance to step 314, which includes enabling very high resolution using distributed aperture radar mode by issuing a software command from the autonomous driving system computer 250. This enables significantly increased processing or received signals from the radars (e.g., static radar 220 and articulated radars 210, 230).

Process 300 may further include step 316, which includes a field of view coverage that is optimized for path of travel with very high resolution enabled for detecting road debris and small object with the radars (e.g., static radar 220 and articulated radars 210, 230).

If the maneuver requires medium range detections or medium range mode is requested (e.g., urban/suburban driving less than 35 MPH), process 300 may advance to step 320 and issue a CAN command to servo motor controllers (e.g., servo motor controllers 214, 234) to articulate radars (e.g., articulated radars 210, 230) to point to the sides of the autonomous vehicle to maximize field of view coverage (e.g., +45°, −45°).

Process 300 may then advance to step 322, which includes enabling City Mode for the radars (e.g., static radar 220 and articulated radars 210, 230) by issuing a software command from the autonomous driving system computer 250. This can include instructing the radars (e.g., static radar 220 and articulated radars 210, 230) to prioritize range gate and velocity gate sizes.

Process 300 may further include step 324, which includes a field of view coverage that is now a maximized (e.g., up to 360° around the autonomous vehicle) radar range that is appropriate for city driving.

Figure 6:
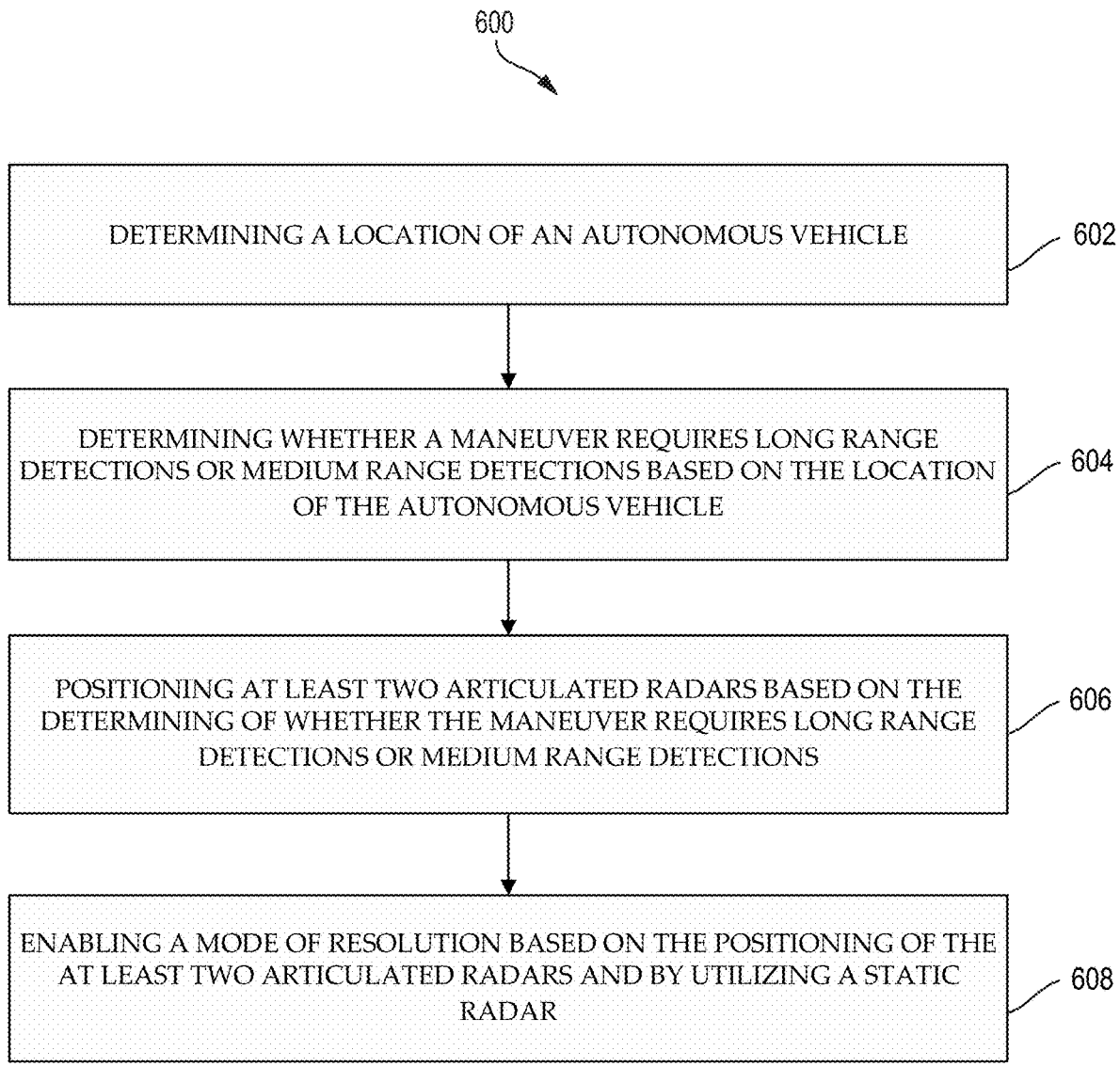
FIG. 6 illustrates an example process for generating an on-demand distributed aperture by mechanical articulation, according to some aspects of the disclosed technology.

Having disclosed some example system components and concepts, the disclosure now turns to FIG. 6, which illustrates an example method 600 for generating an on-demand distributed aperture by mechanical articulation. The steps outlined herein are exemplary and can be implemented in any combination thereof, including combinations that exclude, add, or modify certain steps.

At step 602, the method 600 can include determining, by an autonomous driving system computer, a location of an autonomous vehicle.

At step 604, the method 600 can include determining, by the autonomous driving system computer, whether a maneuver requires long range detections or medium range detections based on the location of the autonomous vehicle. The maneuver can be at least one of high speed driving, an unprotected turn across oncoming traffic, and urban driving.

At step 606, the method 600 can include positioning, by the autonomous driving system computer, at least two articulated radars based on the determining of whether the maneuver requires long range detections or medium range detections. The positioning of the at least two articulated radars can include positioning the at least two radars to point forward of the autonomous vehicle. The positioning of the at least two articulated radars can include positioning a first radar of the at least two radars to point +45° relative to a front of the autonomous vehicle and a second radar of the at least two radars to point −45° relative to the front of the autonomous vehicle.

At step 608, the method 600 can include enabling, by the autonomous driving system computer, a mode of resolution based on the positioning of the at least two articulated radars and by utilizing a static radar. The static radar can be permanently fixed in one position and be directed towards a front of the autonomous vehicle. The mode of resolution can be a long range mode that utilizes the at least two radars pointing forward of the autonomous vehicle. The mode of resolution can be a distributed aperture radar mode that enables very high resolution.

Figure 7:
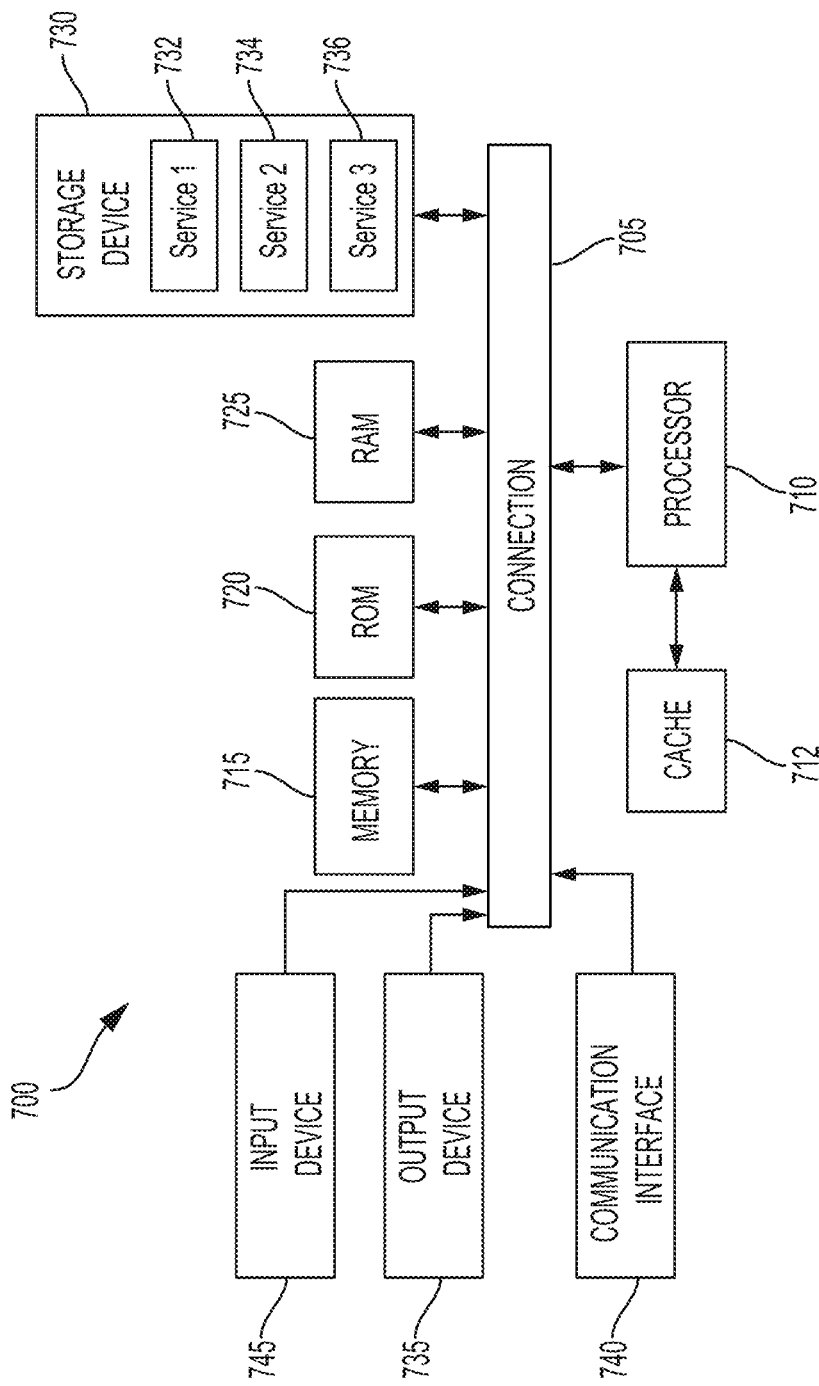
FIG. 7 illustrates an example processor-based system with which some aspects of the subject technology can be implemented.

FIG. 7 illustrates an example processor-based system with which some aspects of the subject technology can be implemented. For example, processor-based system 700 that can be any computing device making up internal computing system 110, remote computing system 150, a passenger device executing the rideshare app 170, internal computing device 130, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, and/or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. By way of example computer-executable instructions can be used to implement perception system functionality for determining when sensor cleaning operations are needed or should begin. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method comprising:
   determining whether a maneuver requires a first range detection or a second range detection based on a surrounding environment of an autonomous vehicle;
   positioning at least two articulated radars based on the determining of whether the maneuver requires the first range detection or the second range detection; and
   enabling a mode of resolution based on the positioning of the at least two articulated radars and by utilizing a static radar.

2. The computer-implemented method of claim 1, wherein the static radar is permanently fixed in one position and is directed towards a front of the autonomous vehicle.

3. The computer-implemented method of claim 1, wherein the maneuver is at least one of high speed driving, an unprotected turn across oncoming traffic, and urban driving.

4. The computer-implemented method of claim 1, wherein the positioning of the at least two articulated radars includes positioning the at least two articulated radars to point forward of the autonomous vehicle.

5. The computer-implemented method of claim 4, wherein the mode of resolution is a long range mode that utilizes the at least two articulated radars pointing forward of the autonomous vehicle.

6. The computer-implemented method of claim 1, wherein the mode of resolution is a distributed aperture radar mode that enables very high resolution.

7. The computer-implemented method of claim 1, wherein the positioning of the at least two articulated radars includes positioning a first radar of the at least two articulated radars to point +45° relative to a front of the autonomous vehicle and a second radar of the at least two articulated radars to point −45° relative to the front of the autonomous vehicle.

8. An autonomous driving system comprising:
one or more processors; and
at least one computer-readable storage medium having stored therein instructions which, when executed by the one or more processors, cause the autonomous driving system to:
determine whether a maneuver requires a first range detection or a second range detection based on a surrounding environment of an autonomous vehicle;
position at least two articulated radars based on the determining of whether the maneuver requires the first range detection or the second range detection; and
enable a mode of resolution based on the positioning of the at least two articulated radars and by utilizing a static radar.

9. The autonomous driving system of claim 8, wherein the static radar is permanently fixed in one position and is directed towards a front of the autonomous vehicle.

10. The autonomous driving system of claim 8, wherein the maneuver is at least one of high speed driving, an unprotected turn across oncoming traffic, and urban driving.

11. The autonomous driving system of claim 8, wherein the position of the at least two articulated radars includes positioning the at least two articulated radars to point forward of the autonomous vehicle.

12. The autonomous driving system of claim 11, wherein the mode of resolution is a long range mode that utilizes the at least two articulated radars pointing forward of the autonomous vehicle.

13. The autonomous driving system of claim 8, wherein the mode of resolution is a distributed aperture radar mode that enables very high resolution.

14. The autonomous driving system of claim 13, wherein the position of the at least two articulated radars includes positioning a first radar of the at least two articulated radars to point +45° relative to a front of the autonomous vehicle and a second radar of the at least two articulated radars to point −45° relative to the front of the autonomous vehicle.

15. A non-transitory computer-readable storage medium comprising:
instructions stored on the non-transitory computer-readable storage medium, the instructions, when executed by one more processors, cause the one or more processors to:
determine whether a maneuver requires a first range detection or a second range detection based on a surrounding environment of an autonomous vehicle;
position at least two articulated radars based on the determining of whether the maneuver requires the first range detection or the second range detection; and
enable a mode of resolution based on the positioning of the at least two articulated radars and by utilizing a static radar.

16. The non-transitory computer-readable storage medium of claim 15, wherein the static radar is permanently fixed in one position and is directed towards a front of the autonomous vehicle.

17. The non-transitory computer-readable storage medium of claim 15, wherein the maneuver is at least one of high speed driving, an unprotected turn across oncoming traffic, and urban driving.

18. The non-transitory computer-readable storage medium of claim 15, wherein the position of the at least two articulated radars includes positioning the at least two articulated radars to point forward of the autonomous vehicle.

19. The non-transitory computer-readable storage medium of claim 18, wherein the mode of resolution is a long range mode that utilizes the at least two articulated radars pointing forward of the autonomous vehicle.

20. The non-transitory computer-readable storage medium of claim 15, wherein the mode of resolution is a distributed aperture radar mode that enables very high resolution.

* * * * *